US005285502A

United States Patent [19]

Walton et al.

[11] Patent Number: 5,285,502

[45] Date of Patent: Feb. 8, 1994

[54] AID TO HEARING SPEECH IN A NOISY ENVIRONMENT

[75] Inventors: Joseph P. Walton, Fairport; Kenneth R. Miller, Macedon; James C. Taylor, Rush; Lynn F. Fuller, Canandiagua; Robert D. Frisina, Penfield, all of N.Y.

[73] Assignee: Auditory System Technologies, Inc., Pittsford, N.Y.

[21] Appl. No.: 861,301

[22] Filed: Mar. 31, 1992

[51] Int. Cl.[5] .......... H04B 15/00

[52] U.S. Cl. .......... 381/94

[58] Field of Search .......... 381/94, 110, 68.2, 68.4, 381/98

[56] References Cited

U.S. PATENT DOCUMENTS

| | | |
|---|---|---|
| 3,209,083 | 9/1965 | Posen . |
| 3,764,745 | 10/1973 | Bottcher et al. . |
| 3,792,367 | 2/1974 | Fleischer et al. . |
| 3,920,931 | 11/1975 | Yanick, Jr. . |
| 3,927,279 | 12/1975 | Nakamura et al. . |
| 4,025,721 | 5/1977 | Graupe et al. . |
| 4,061,875 | 12/1977 | Freifeld et al. . |
| 4,119,814 | 10/1978 | Harless . |
| 4,405,831 | 9/1983 | Michelson . |
| 4,490,585 | 12/1984 | Tanaka . |
| 4,718,099 | 1/1988 | Hotvet . |
| 4,750,207 | 6/1988 | Gebert et al. . |
| 4,792,977 | 12/1988 | Anderson et al. . |
| 4,837,832 | 6/1989 | Fanshel . |
| 5,001,441 | 3/1991 | Gen-Kuong . |

FOREIGN PATENT DOCUMENTS

| | | |
|---|---|---|
| 2353696 | 5/1975 | Fed. Rep. of Germany . |
| 8302862 | 8/1983 | PCT Int'l Appl. . |

OTHER PUBLICATIONS

"Designing with the Adaptive High Pass Filter", Gennum Corporation, Oct. 1989.

"Sound Field Audiometry and Hearing Aid Selection", pp. 204–207, *Hearing Instrument Selection and Evaluation*, Ernest Zelnick, Editor, published by Natl. Institute for Hearing Instruments Studies, 1987.

"Review of Suggested Hearing Aid Procedures," pp. 20–25, Ibid.

"*Hearing Aid Assessment and Use in Audiologic Habilitation*", Wm. R. Hodgson, Ed., publ. by Wms. & Wilkins., Chapters 5 (pp. 109–125) & 6 (pp. 128–144), 1981.

"Active Filter Design Using Operational Transconductance Amplifiers: A Tutorial", by. R. A. Geiger & E. Sanchez-Sinencio, pp. 20–32, *IEEE Circuits and Devices*, Mar. 1985.

*Primary Examiner*—Forester W. Isen
*Attorney, Agent, or Firm*—Eugene Stephens & Associates

[57] ABSTRACT

A signal processing circuit is incorporated into an audio reproducing device for suppressing noise while preserving distinctive features of speech. A noise detecting circuit includes a low pass filtering circuit (12) and a level detector (14). An output signal (C) from the detecting circuit controls a variable high pass filtering circuit (20) to attenuate a range of low frequencies of an input signal (A) proportional to the detected level of noise. The variable high pass filtering circuit exhibits a family of variable response curves (22, 24, and 26) that vary in slope below a common cut-off frequency (28) that is below a range of frequencies that convey a majority of second formant transitions between consonants and vowels.

48 Claims, 3 Drawing Sheets

AID TO HEARING SPEECH IN A NOISY ENVIRONMENT

TECHNICAL FIELD

The invention relates to the field of audio processing devices for improving intelligibility of speech in noisy environments.

BACKGROUND

Speech intelligibility can be reduced by background noises, which include loud, confusing, or distracting sounds. Hearing impaired persons often have particular difficulty discerning speech in noisy environments, but people without any hearing disorder can experience similar difficulties in environments with high noise levels.

Audio processing devices have used a variety of techniques for suppressing unwanted noise. One commonly used technique attenuates large amplitude audio signals for protecting against the reproduction of excessively loud noises. Another technique attenuates low frequencies of sound to help prevent a so-called "upward spread of masking" by low frequency noises, which reduces intelligibility of the higher frequency sounds.

For example, U.S. Pat. No. 4,061,875 to Freifeld et al. discloses an audio processor that incorporates an adjustable high pass filter to reduce low frequency noise components of an audio signal. The cut-off frequency of the high pass filter can be adjusted in steps from 0.25 to 1.5 kilohertz, and the rate of attenuation of the filter (i.e., the roll-off rate) can be adjusted at each cut-off frequency in steps of 6, 12, and 18 decibels per octave. Together, these two adjustments are used to discriminate against particular noises.

U.S. Pat. No. 4,792,977 to Anderson et al. discloses a hearing aid circuit having a series of state variable filters for controlling frequency response characteristics. The pass band of the filter series can be adjusted to attenuate predetermined low frequencies of noise. The state variable filters are implemented in an integrated circuit using capacitor loaded operational transconductance amplifiers and include separate external controls for varying respective outputs of a high pass filter, a low pass filter, and a variable slope filter. The high and low pass filters are both fourth order filters (e.g., four pole filters) made up of two cascaded second order filters. The external controls set frequency response characteristics by adjusting the cut-off frequencies of the high and low pass filters without substantially changing the respective shapes ("Q") of their frequency response curves.

Although a predetermined amount of attenuation of particular low frequencies of sound can help to prevent certain kinds of noise from masking higher frequencies that are more important to speech intelligibility, the amount of predetermined attenuation can be more or less than that required for optimally attenuating the noise. For example, if too little attenuation is provided, some masking remains. However, if too much attenuation is provided, the perceived sound quality is unnecessarily reduced. In the absence of masking noise, attenuation of the low frequencies also reduces intelligibility.

Audio processing devices have also been designed to attenuate low frequencies of sound as a function of noise energy. For example, U.S. Pat. No. 4,490,585 to Tanaka discloses a hearing aid in which a low frequency component of ambient sound is used to shift a cut-off frequency of a high pass filter. An increasing level of the low frequency sound is used to shift the cut-off frequency up to 1.5 kilohertz for attenuating loud noises within the low frequency spectrum. However, important speech information is also conveyed at frequencies much less than 1.5 kilohertz, and shifting the cut-off frequency of the high pass filter through this region reduces speech intelligibility as well as noise.

U.S. Pat. No. 3,927,279 to Nakamura et al. discloses a hearing aid in which both lower and higher frequency components of the acoustic spectrum are attenuated in response to the detection of sound energy at frequencies considered above and below frequencies required for speech. A band-rejection filter is used to isolate frequencies below 300 hertz and above 3000 hertz, and the energy content of the isolated bands is detected to form a control signal. Response characteristics of both a high pass filter and a low pass filter are varied by the control signal to attenuate high and low frequency noises.

However, the hearing aid of Nakamura et al., like the hearing aid of Tanaka, also attenuates frequencies that convey important speech information. For example, the hearing aid of Nakamura et al. attenuates to some degree the entire range of frequencies between 300 and 3000 hertz, which includes frequencies containing crucial information for identifying both consonants and vowels.

SUMMARY OF INVENTION

Our invention is directed to suppressing noise while preserving sounds that are important to speech intelligibility. In the absence of noise, low frequencies of sound can be preserved to maintain a perceived quality of sound. However, upon detection of noise, the low frequencies are attenuated as a continuous function of their energy content.

For example, our invention can be arranged as a signal processor having a high pass filtering circuit that exhibits a variable response curve. A controlling circuit of the processor varies a slope of the response curve as a function of the energy content of the low frequencies. The response curve is varied in slope below a cut-off frequency that is below a range of frequencies that convey a majority of second formant transitions between consonants and vowels. Frequencies below the cut-off frequency are progressively attenuated in accordance with the slope of the response curve. In other words, frequencies closer to the cut-off frequency are attenuated less than frequencies farther from the cut-off frequency, and this difference is accentuated by an increase in the slope of the response curve.

The second formant transitions of speech are crucial for the accurate identification of many consonant sounds. In addition, second formant transitions help to identify the underlying vowel sounds that produce the second formants in transition. The cut-off frequency of the response curve is positioned to preserve at least a majority of the second formant transitions, and frequencies below the cut-off frequency are attenuated by varying the slope of the response curve below the cut-off frequency to minimize attenuation of any remaining second formant transitions. In this way, noise in the low frequency spectrum is attenuated while minimizing any loss of sound that is important for speech intelligibility. Together, the attenuation of noise and the preservation of second formant transitions can significantly improve speech intelligibility in noisy environments.

Our signal processor can also be arranged to closely relate the frequencies that are monitored for detecting noise with the frequencies that are attenuated as a function of the detected noise. For example, a low pass filtering circuit can be used to detect the low frequency noises. The low pass filtering circuit at least partially attenuates frequencies above the cut-off frequency of the high pass filtering circuit and at least partially transmits frequencies just below the same cut-off frequency.

The attenuation of frequencies by the low pass filtering circuit just above the cut-off frequency of the high pass filtering circuit helps to prevent frequencies of noise outside the range of frequencies that are variably attenuated by the high pass filtering circuit from inducing the variable attenuation, which could reduce perceived sound quality and intelligibility without reducing the noise. The transmission of frequencies of the low pass filtering circuit just below the cut-off frequency of the high pass filtering circuit helps to prevent the variable attenuation of frequencies by the high pass filtering circuit that are outside the range of frequencies that are monitored for noise by the low pass filtering circuit, which could unnecessarily reduce intelligibility along with the desired reduction in noise.

Preferably, the low pass filtering circuit has a cut-off frequency that is above a range of frequencies that convey a majority of first formants of speech to detect particularly obfuscating background noises such as the din of speech chatter. Also, the low pass filtering circuit preferably has a high roll-off rate to enable the cut-off frequencies of the low pass and the high pass filtering circuits to be positioned closely together in frequency.

DRAWINGS

DETAILED DESCRIPTION

Figure 1:
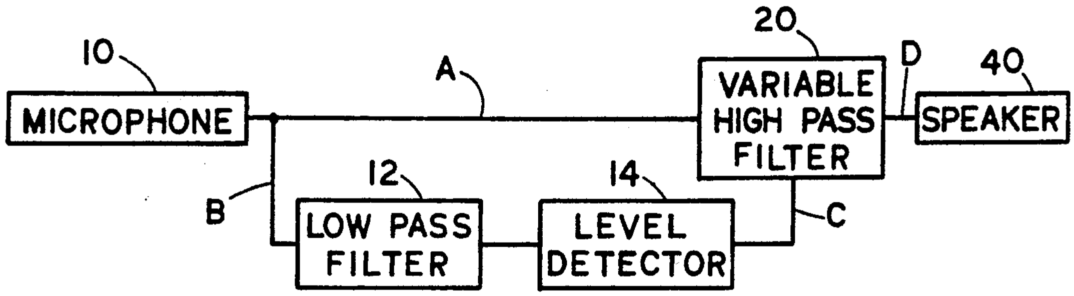
FIG. 1 is a block diagram of an audio reproducing device having a signal processor for suppressing noise while preserving distinctive features of speech.

An example of our invention as a signal processor incorporated into an audio reproducing device is shown in FIG. 1. The device, which could be mounted in a headset or hearing aid, is intended to improve speech intelligibility in noisy environments.

A microphone 10 converts ambient sound energy into electrical energy as an audio signal "A" conveying a frequency range covering the range of most voices. A signal "B" is split from the signal "A" for controlling reproduction of signal "A" by the audio reproducing device.

Figure 2:
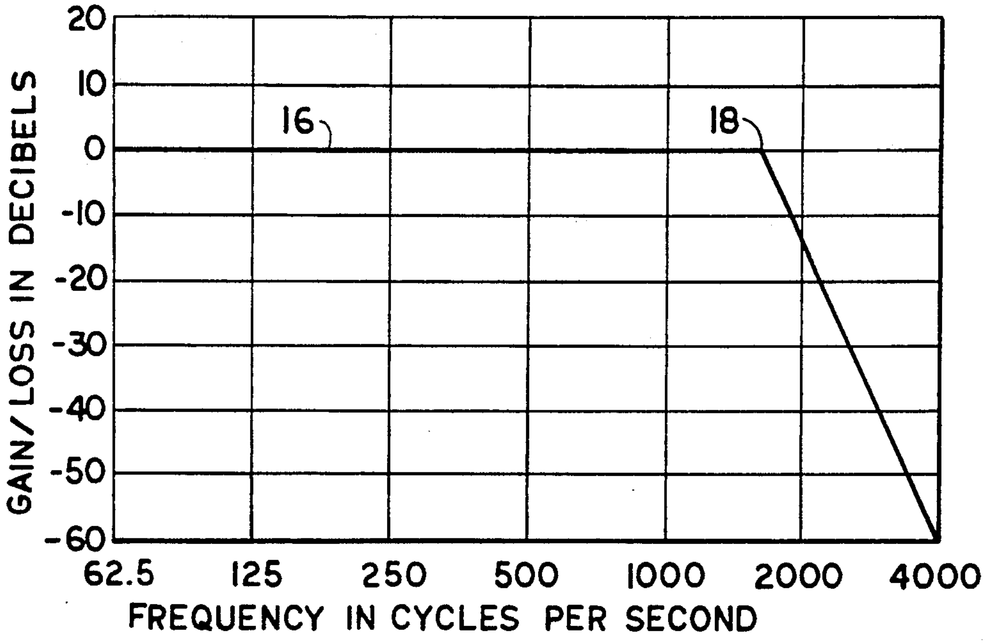
FIG. 2 is a graph depicting a simplified asymptotic representation of a response curve exhibited by a low pass filtering circuit shown in FIG. 1.

The signal "B" is processed by a low pass filtering circuit 12 as a part of a detecting circuit, including a level detector 14, for determining the energy content of a low frequency band of the signal. The low pass filtering circuit 12 exhibits a response curve expressible in decibels over a domain of frequencies. FIG. 2 depicts the response curve in a simplified form as piecewise curve 16 composed of two interconnected asymptotes of the actual response curve. A cut-off frequency 18 (approximately 750 hertz) along the response curve 16 separates the audio signal "B" into a band of low frequencies (below 750 hertz) that are substantially transmitted and a band of high frequencies (above 750 hertz) that are substantially attenuated.

The low pass filtering circuit 12 works in conjunction with microphone 10 to transmit frequencies containing particularly obfuscating noises but little speech information. For example, the cut-off frequency of the low pass filtering circuit 12 is positioned above the range of frequencies conveying the majority of first formants of speech (i.e., above 600 hertz) to transmit a band of frequencies containing the largest amount of long term speech energy. This band also contains most of the energy associated with background chatter, which can mask higher frequencies conveying more important speech information.

The level detector 14, which can be constructed as a conventional root mean square value detector, determines the energy content of the frequencies transmitted by the low pass filtering circuit and produces an output signal "C" that is proportional to the detected energy content as a measure of noise. The signal "C" takes a form of a control signal that controls operation of a variable high pass filtering circuit 20.

Figure 3:
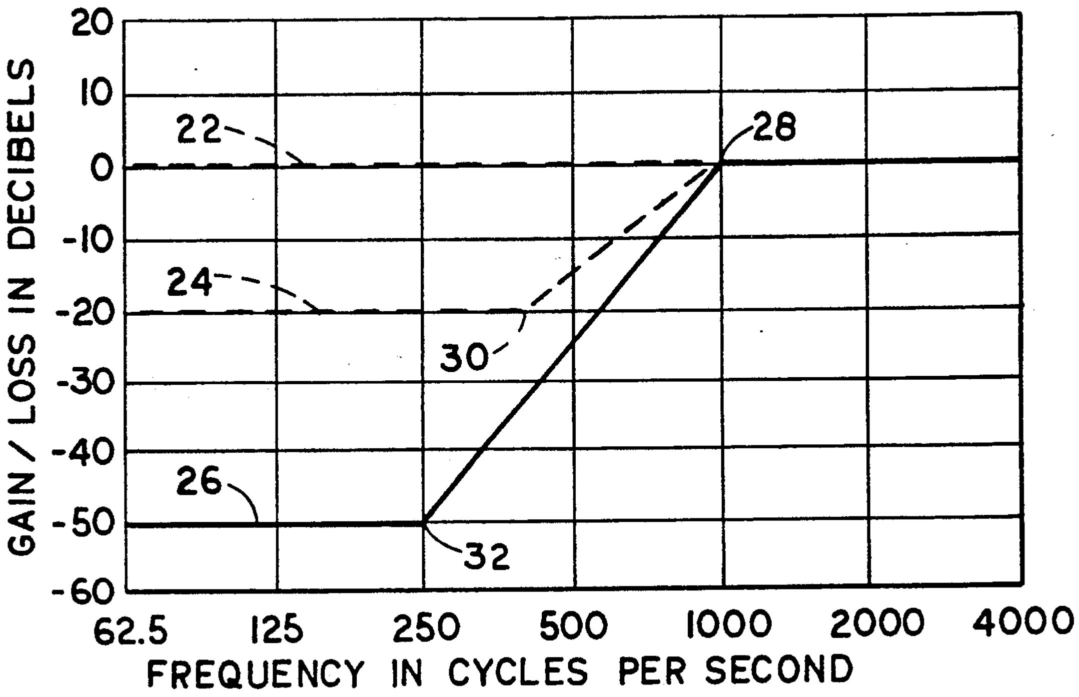
FIG. 3 is a graph similarly depicting three of a family of possible response curves exhibited by a variable high pass filtering circuit shown in FIG. 1.

The signal "A" is processed by the variable high pass filtering circuit 20 in parallel with the processing of the signal "B". The variable high pass filtering circuit exhibits a variable response curve that can take a form of any one of a family of response curves. Similar to the depiction of the response curve 16 in FIG. 2, FIG. 3 depicts three piecewise curves 22, 24, and 26 that are representative of the family of response curves exhibited by the variable high pass filtering circuit 20. A cut-off frequency 28 (approximately 1000 hertz) terminating a common section of the three response curves 22, 24, and 26 separates the audio signal "A" into a band of low frequencies (below 1000 hertz) that are substantially attenuated and a band of high frequencies (above 1000 hertz) that are substantially transmitted.

The amount of attenuation of the low frequencies is controlled by the particular response curve exhibited by the variable high pass filtering circuit. For example, response curve 22 produces little or no attenuation, whereas response curves 24 and 26 produce progressively more attenuation. The response curves differ by varying in slope below the cut-off frequency 28. The control signal "C" determines which among the family of response curves are exhibited by the variable high pass filtering circuit. In other words, the control signal "C" has the effect of varying the slope of the variable response curve exhibited by the variable high pass filtering circuit.

The cut-off frequency 28 is positioned below the range of frequencies conveying the majority of second formant transitions between consonants and vowels (i.e., below 1500 hertz). Frequencies below the cut-off frequency are progressively attenuated in accordance with the slope of the response curve. This reduces attenuation of any second formant transitions below the cut-off frequency while increasing attenuation of lower frequencies that convey less speech information. The second formant transitions can be further preserved by positioning the cut-off frequency below a range of frequencies conveying a larger percentage of the transitions. For example, the cut-off frequency 28 is positioned at 1000 hertz.

The slope of the response curve is increased in proportion to the value of the control signal "C" to attenuate disproportionately large amounts of sound energy in the low frequency spectrum monitored by the detecting circuit. However, the slope of the response curve is preferably limited to a maximum roll-off 24 decibels per octave to further limit attenuation of frequencies close to the cut-off frequency.

Once a desired level of attenuation is reached in the direction of roll-off along the variable response curve, the slope of the variable response curve preferably levels off (i.e., returns to zero slope) to attenuate the remaining low frequencies by substantially the same amount. For example, response curve 24 has a corner frequency 30 that limits attenuation of frequencies below 400 hertz to a constant 20 decibels. This prevents unnecessarily high attenuation of certain low frequencies, including some of the first formants of speech, in response to relatively low levels of undesirable sound energy. In other words, the desired amount of attenuation is achieved with a minimum effect on perceived sound quality.

Also, the cut-off frequency preferably remains constant while the slope of the response curve is varied. Significant shifts in the cut-off frequency would undesirably attenuate frequencies containing important speech information. The range of frequencies conveying the majority of second formant transitions of speech is preferably attenuated by no more than 5 decibels. In particular, attenuation at 1000 hertz is preferably limited to no more than 5 decibels while attenuation at 250 hertz is preferably at least 35 decibels.

Figure 4:
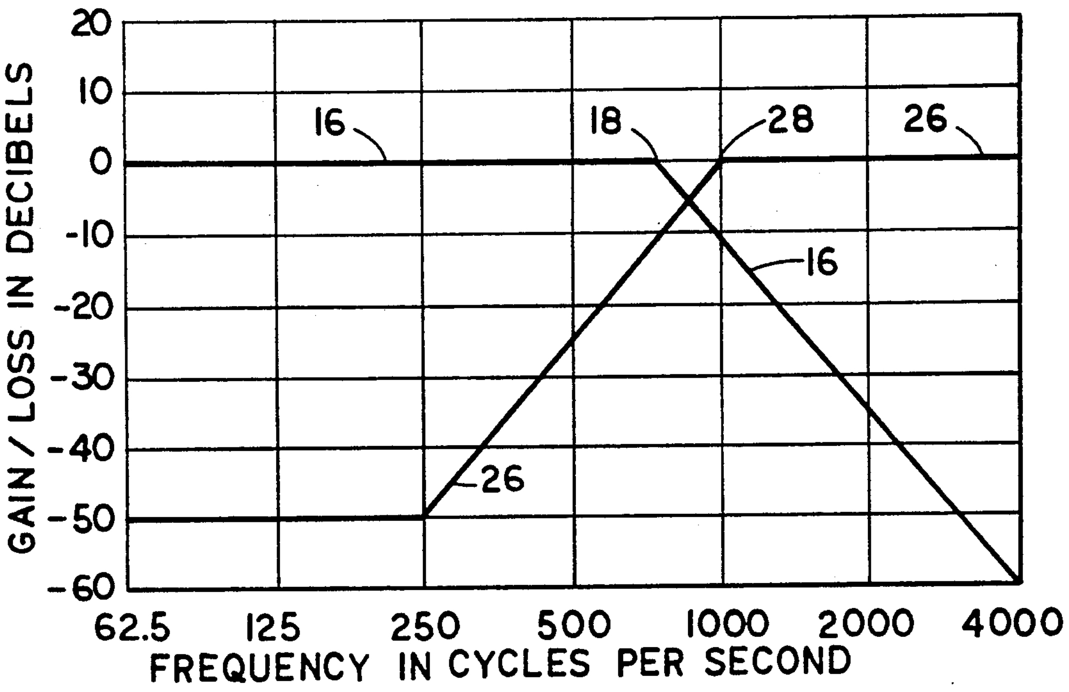
FIG. 4 is a graph in which one of the response curves of FIG. 3 is superimposed on the response curve of FIG. 2.

FIG. 4 shows a relationship between the cut-off frequency 18 of the low pass filtering circuit 12 and the cut-off frequency 28 of the variable high pass filtering circuit 20 such that the band of low frequencies (e.g., frequencies below 750 hertz) that are substantially transmitted by the low pass filtering circuit 12 approximately corresponds to the band of low frequencies (e.g., frequencies below 1000 hertz) that are attenuated by the variable high pass filter. The low pass filtering circuit at least partially attenuates high frequencies above the cut-off frequency 28 (e.g., frequencies above 1000 hertz) and at least partially transmits frequencies below the cut-off frequency 28 (e.g., frequencies below 1000 hertz).

Furthermore, the cut-off frequency 28 of the variable high pass filtering circuit is preferably higher than the cut-off frequency 18 of the low pass filtering circuit so that the band of low frequencies (e.g., frequencies below 750 hertz) that are substantially transmitted by the low pass filtering circuit do not include frequencies that are within the band of high frequencies (e.g., frequencies above 1000 hertz) that are substantially transmitted by the variable high pass filtering circuit. This limitation helps to assure that the high pass filtering circuit 20 does not attempt to attenuate noise occurring at frequencies beyond the range of frequencies that can be attenuated by the high pass filtering circuit.

Conversely, the cut-off frequency 18 of the low pass filtering circuit is preferably not more than one-half octave lower than the cut-off frequency 28 of the variable high pass filtering circuit so that the band of low frequencies (e.g., frequencies below 1000 hertz) that are substantially attenuated by the variable high pass filtering circuit include only a limited range of frequencies (e.g., frequencies between 750 and 1000 hertz) that are above the band of low frequencies (i.e. frequencies below 750 hertz) that are substantially transmitted by the low pass filtering circuit. This limitation helps to assure that frequencies above those monitored for noise are not unnecessarily attenuated along with the frequencies containing the monitored noise.

The low pass filtering circuit 12 is preferably constructed as a high order filter (e.g., a four pole filter) having a roll-off rate of at least 24 decibels per octave. The high roll-off rate maximizes the attenuation of frequencies that are above the cut-off frequency 28 of the variable high pass filtering circuit and allows for the respective cut-off frequencies 18 and 28 of the low pass filtering circuit and variable high pass filtering circuit to be positioned close together.

Figure 5:
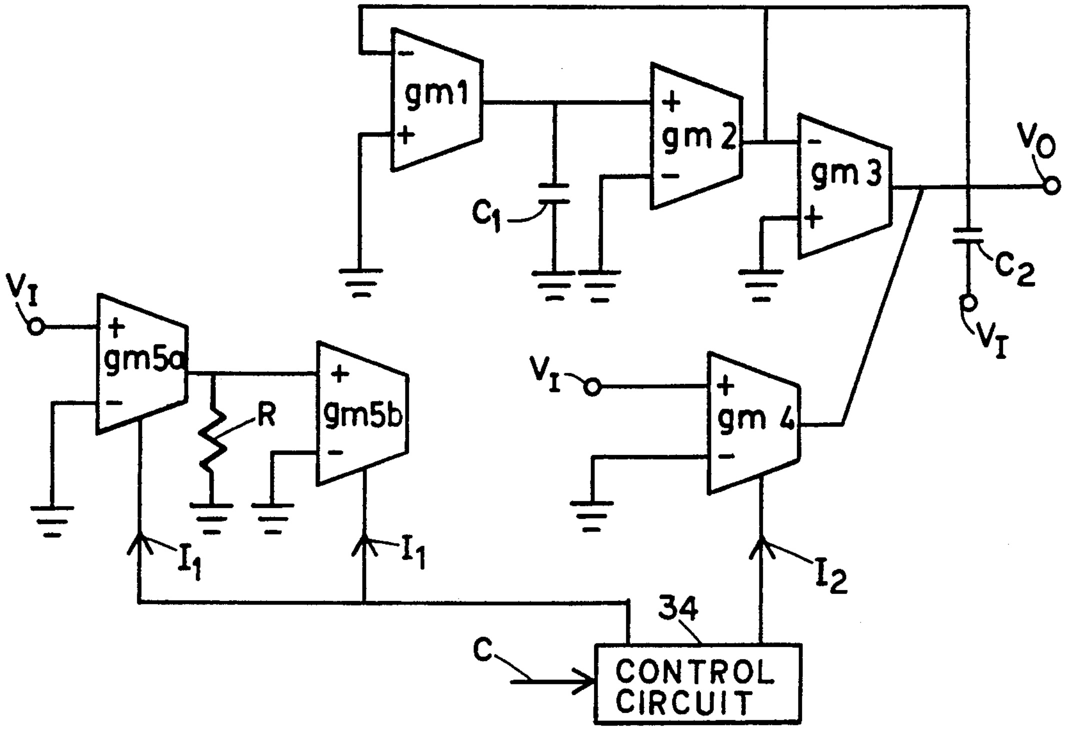
FIG. 5 is a circuit diagram of a building block of the variable high pass filtering circuit as a biquadratic filter structure.
Figure 6:
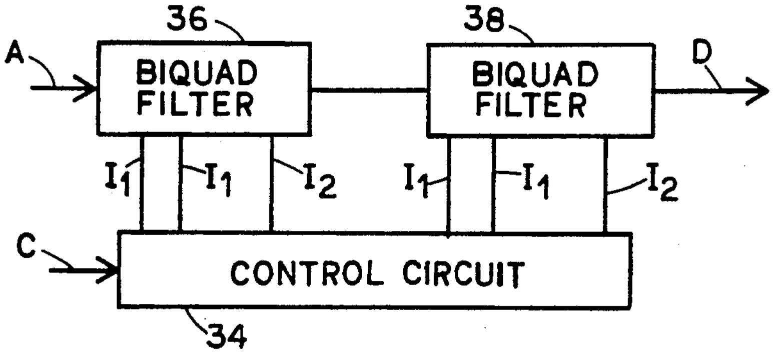
FIG. 6 is a block diagram showing two biquadratic filter structures connected in series for constructing the variable high pass filtering circuit.
Figure 1:
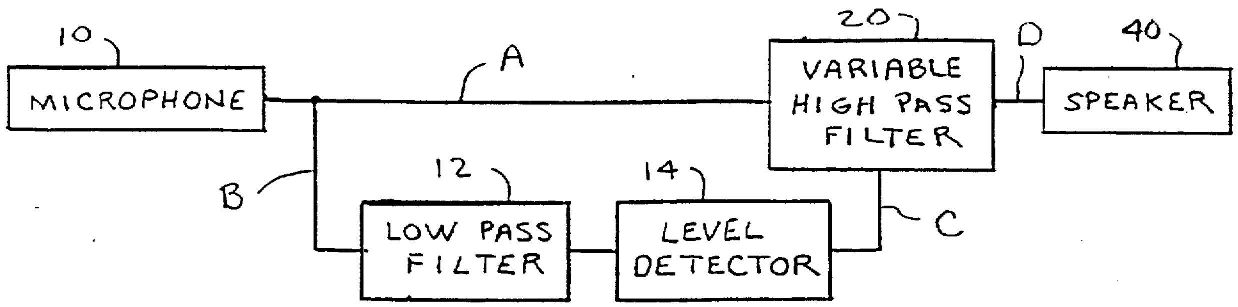
Figure 2:
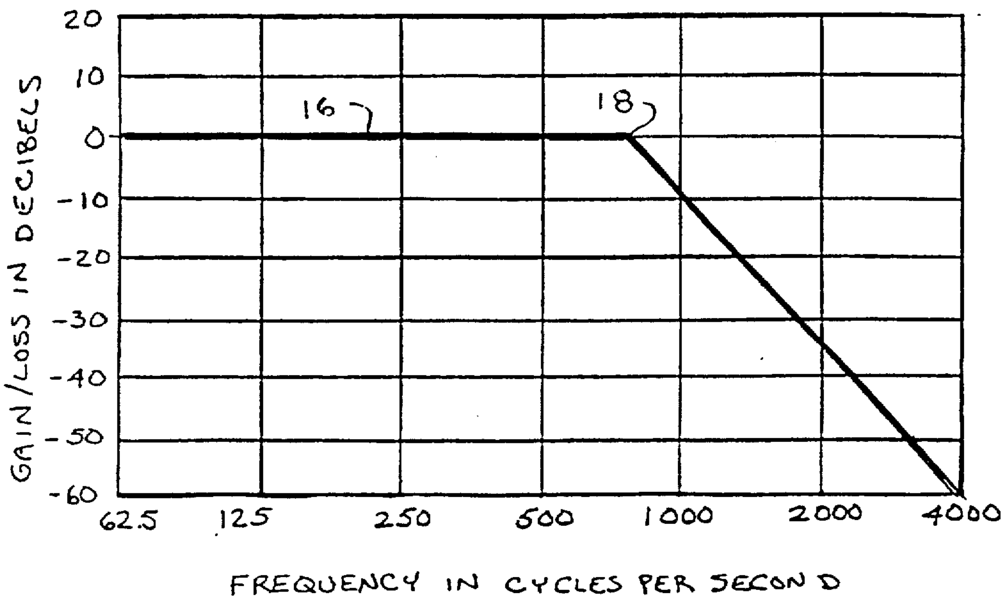

FIG. 5 depicts details of one of two identical biquadratic structures that are shown in FIG. 6 cascaded together in series to produce a variable fourth order filter. Each biquadratic structure exhibits a general transfer function "H(s)" as follows:

$$H(s) = \frac{s^2 + (W_z/Q_z)\,s + W_z^2}{s^2 + (W_p/Q_p)\,s + W_p^2}$$

where "s" is an angular frequency equal to j [2 pi f] (with "j" being an imaginary number equal to the square root of −1, with "pi" being the ratio of the circumference of a circle to its diameter, and with "f" being frequency measured in hertz); "$W_z$" is a corner frequency (in angular measure) associated with a "zero" of the function; "$W_p$" is a corner frequency (also in angular measure) associated with a "pole" of the function; and "$Q_z$" and "$Q_p$" are terms referred to as "quality factors" or "inverse damping factors".

The particular biquadratic filter structure illustrated includes six operational transconductance amplifiers labeled "$g_{m1}$", "$g_{m2}$", "$g_{m3}$", "$g_{m4}$", "$g_{m5a}$", and "$g_{m5b}$". Each transconductance amplifier includes two inputs that produce a differential voltage, which is multiplied by a transconductance gain of the amplifiers to produce an output current. The output of each transconductance amplifiers is connected to ground through one of capacitors "$C_1$" and "$C_2$" or resistor "R".

The output of the circuit as a model of the transfer function H(s) is given below:

$$H(s) = \frac{V_o}{V_i} = \frac{(C_1\,C_2)\,s^2 + (C_1\,g_{m4})\,s + (g_{m2}\,g_{m5})}{(C_1\,C_2)\,s^2 + (C_1\,g_{m3})\,s + (g_{m1}\,g_{m2})}$$

where "Vo" and "Vi" are the respective output and input voltages shown in FIG. 5; "$g_{m1}$", "$g_{m2}$", "$g_{m3}$", "$g_{m4}$" are the transconductance gains of the amplifiers labeled the same; "$g_{m5}$" is the effective transconductance gain of the two amplifiers labeled "$g_{m5a}$" and "$g_{m5b}$"; and "$C_1$" and "$C_2$" are the respective capacitances of the like-labeled capacitors. The two biquadratic filter structures 36 and 38 produce in series a fourth order transfer function obtained by squaring the above transfer function of a single biquadratic filter structure.

Relating the particular transfer function of the circuit shown in FIG. 5 to the general transfer function of a biquadratic filter yields the following equations for the corner frequencies "$W_z$" and "$W_p$" and quality factors "$Q_z$" and "$Q_p$":

$$W_z = \frac{(g_{m2}\,g_{m5})^{0.5}}{(C_1\,C_2)^{0.5}}$$

$$W_p = \frac{(g_{m1}\,g_{m2})^{0.5}}{(C_1\,C_2)^{0.5}}$$

$$Q_z = \frac{1}{g_{m4}}\,\frac{(g_{m2}\,g_{m5}\,C_2)^{0.5}}{(C_1)^{0.5}}$$

$$Q_p = \frac{1}{g_{m3}}\,\frac{(g_{m1}\,g_{m2}\,C_2)^{0.5}}{(C_1)^{0.5}}$$

Since the values of the two corner frequencies and two quality factors are determined by a total of five variables, the corner frequencies and quality factors can be independently set. For example, the corner frequency "$W_p$", representing the pole of the function, is set to produce the desired cut-off frequency 28 of the variable high pass filtering circuit. The quality factors "$Q_z$" and "$Q_p$" are both preferably set equal to approximately 0.707 to provide for maximum change in curvature at the corner frequency "$W_p$" without producing a peak. The corner frequency "$W_z$", representing the zero of the function, is controlled to vary the slope of the variable response curve.

The corner frequency "$W_z$" appears along response curves 24 and 26 as the respective corner frequencies 30 and 32. Thus, the change in corner frequency "$W_z$" produces not only a change in slope of the variable response curve but also changes the maximum attenuation of the variable response curve.

The corner frequency "$W_z$" is varied by changing the value of "$g_{m5}$". However, an isolated change in "$g_{m5}$" would also have the undesirable effect of changing the quality factor "$Q_z$". Accordingly, "$g_{m5}$" is varied by a first factor that is a square of a second factor for simultaneously varying "$g_{m4}$". Proportional currents "$I_1$" and "$I_2$" are controlled by a control circuit 34 to produce this effect.

The transconductance gain of the amplifier "$g_{m4}$" is proportional to the control current "$I_2$". However the total transconductance gain by the two amplifiers "$g_{m5a}$" and "$g_{m5b}$" connected in series is proportional to the square of the control current "$I_l$". Accordingly, the proportional control signals "$I_1$" and "$I_2$" cooperate with the two amplifiers "$g_{m5a}$" and "$g_{m5b}$" to provide the necessary filter control logic to vary the corner frequency "$W_z$" without varying the corner frequency "$W_p$" or quality factors "$Q_z$" and "$Q_p$".

FIG. 6 illustrates two identical biquadratic filter structures cascaded together in series to construct the variable high pass filtering circuit 20. The control circuit 34 controls currents to both biquadratic filters to vary the slope of the variable response curve in response to the control signal "C" from level detector 14. Output signal "D" from the high pass filtering circuit drives speaker 40 (see FIG. 1) for reproducing signal "A" in a clarified form optimum for discerning important speech information.

Although the slope of the variable response curve is preferably varied by moving the corner frequency "$W_z$" representing the zero of the biquadratic transfer function, similar effects can be achieved by varying the pole corner frequency "$W_p$" or the quality factors "$Q_p$" and "$Q_z$". However, three cascaded biquadratic filter structures may be needed to achieve the similar effects with the alternative variables.

At low noise levels monitored by the detecting circuit, the variable high pass filtering circuit 20 does not attenuate any significant portion of the audio signal "A" to preserve the perceived quality of sound reproduced by speaker 40. For example, the variable high pass filtering circuit 20 exhibits the flat response curve 22 up to a predetermined threshold level of noise, which is preferably within 50 to 75 decibels sound pressure level. The actual threshold level can be set to accommodate application environments or user needs. Once the threshold is exceeded, the variable response curve is varied to attenuate the low frequency portion of the signal "A" proportional to the increase in noise level above the threshold.

We claim:

1. A signal processing circuit for suppressing noise while preserving distinctive features of speech comprising:

a detecting circuit for determining an energy level of a noise component of an audio signal;

a filtering circuit exhibiting a variable response curve expressible in decibels over a domain of audible frequencies;

a controlling circuit for varying a slope of a portion of the variable response curve as a continuous function of the energy level of the noise component of the audio signal for reducing the noise component of the audio signal without perceptively attenuating a range of frequencies that convey a majority of second formant transitions between consonants and vowels;

said portion of the variable response curve within which the slope is varied including frequencies between 250 hertz and 1000 hertz; and attenuation at 1000 hertz being no greater than 5 decibels when the slope of the response curve is at a maximum roll-off.

2. The circuit of claim 1 in which attenuation at 250 hertz is at least 35 decibels when the slopes of the response curve is at the maximum roll-off.

3. The circuit of claim 2 in which said controlling circuit provides for varying the slope of the response curve up to a maximum roll-off no greater than 24 decibels per octave.

4. A method of processing an audio signal for suppressing noise while preserving distinctive features of speech comprising the steps of:

determining an energy level of a noise component of the audio signal;

filtering the audio signal in accordance with a variable response curve expressible in decibels over a domain of audible frequencies;

separating the audio signal into a first band of low frequencies that are substantially attenuated and a second band of high frequencies that are substantially transmitted at a cut-off frequency that is below the range of frequencies conveying a majority of second formant transitions between consonants and vowels;

varying a slope of a portion of the variable response curve as a continuous function of the determined energy level of the noise component for reducing the noise component without perceptively attenuating a range of frequencies that convey the majority of second formant transitions; and maintaining the cut-off frequency substantially constant while the slope of the response curve is being varied.

5. A signal processing circuit for suppressing noise while preserving distinctive features of speech comprising:

a detecting circuit for determining an energy level of a noise component of an audio signal;

a filtering circuit exhibiting a variable response curve expressible in decibels over a domain of audible frequencies;

a controlling circuit for varying a slope of a portion of the variable response curve as a continuous function of the energy level of the noise component of the audio signal for reducing the noise component of the audio signal without perceptively attenuating a range of frequencies that convey a majority of second format transitions between consonants and vowels;

said filtering circuit separating a band of low frequencies that are substantially attenuated from a band of high frequencies that are substantially transmitted at a cut-off frequency that is below the range of frequencies conveying the majority of second format transitions; and said cut-off frequency remaining substantially constant while the slope of the response curve is varied.

6. The circuit of claim 5 in which attenuation throughout the range of frequencies conveying the majority of second formant transitions is no greater than 5 decibels when the slope of the response curve is at a maximum roll-off.

7. The circuit of claim 6 in which attenuation at 1000 hertz is no greater than 5 decibels when the slope of the response curve is at the maximum roll-off.

8. The circuit of claim 6 in which attenuation at 250 hertz is at least 35 decibels when the slope of the response curve is at the maximum roll-off.

9. The circuit of claim 5 in which said detecting circuit includes a second filtering circuit having a cut-off frequency that separates the audio signal into a band of low frequencies that are substantially transmitted and a band of high frequencies that are substantially attenuated.

10. The circuit of claim 9 in which said detecting circuit also includes a level detector for determining a magnitude of the audio signal that is transmitted by said second filtering circuit.

11. The circuit of claim 10 in which said cut-off frequency of the second filtering circuit is related to said cut-off frequency of the filtering circuit exhibiting the variable response curve so that the band of low frequencies that are substantially transmitted by the second filtering circuit approximately corresponds to the band of low frequencies that are substantially attenuated by the filtering circuit exhibiting the variable response curve.

12. A signal processing circuit for suppressing noise while preserving distinctive features of speech comprising:

a detecting circuit for determining an energy level of a noise component of an audio signal;

a filtering circuit exhibiting a variable response curve expressible in decibels over a domain of audible frequencies;

a controlling circuit for varying a slope of a portion of the variable response curve as a continuous function of the energy level of the noise component of the audio signal for reducing the noise component of the audio signal without perceptively attenuating a range of frequencies that convey a majority of second formant transitions between consonants and vowels;

the variable response curve being defined by a transfer function; and a corner frequency representing a zero of the transfer function being movable in response to changes in the energy level of the noise component of the audio signal for varying the slope of the response curve.

13. The circuit of claim 12 in which the response curve is defined by at least a fourth order transfer function.

14. The circuit of claim 13 in which said filtering circuit is constructed from two biquadratic filter structures cascaded together in series.

15. The circuit of claim 12 in which movement of said corner frequency also changes a maximum attenuation of a portion of the response curve.

16. The circuit of claim 15 in which the transfer function has a constant quality factor.

17. A signal processing circuit for suppressing noise while preserving distinctive features of speech comprising:

a detecting circuit for determining an energy level of a noise component of an audio signal;

a filtering circuit exhibiting a variable response curve expressible in decibels over a domain of audible frequencies;

a controlling circuit for varying a slope of a portion of the variable response curve as a continuous function of the energy level of the noise component of the audio signal for reducing the noise component of the audio signal without perceptively attenuating a range of frequencies that convey a majority of second formant transitions between consonants and vowels; and the response curve including a first corner frequency representing a cut-off frequency from which the slope of the response curve is varied and a second corner frequency from which the slope of the response curve levels off to an approximately zero slope.

18. The circuit of claim 17 in which a range of frequencies just below the second corner frequency is attenuated by a constant amount.

19. An adaptive signal processor for improving speech discernment in a noisy environment comprising:

a first filter having a first cut-off frequency that separates an audio signal into a first band of low frequencies that are substantially transmitted and a second band of high frequencies that are substantially attenuated;

a level detector for determining a magnitude of the audio signal that is transmitted by the first filter;

a variable second filter having a second cut-off frequency that independently separates the audio signal into a third band of high frequencies that are substantially transmitted and a fourth band of low frequencies that are substantially attenuated as a function of the determined magnitude of the audio signal that is transmitted by the first filter;

said second cut-off frequency being higher than said first cut-off frequency; and said first filter being arranged for attenuating frequencies above said second cut-off frequency at a rate of at least 24 decibels per octave so that the first band of low frequencies that are substantially transmitted by the first filter does not include frequencies that are within the third band of high frequencies that are substantially transmitted by the variable second filter.

20. The processor of claim 19 in which said first cut-off frequency is not more that one-half octave lower than said second cut-off frequency so that the fourth band of low frequencies that are substantially attenuated by the variable second filter includes a minimum range of frequencies that are above the first band of low frequencies that are substantially transmitted by the first filter.

21. The processor of claim 19 in which said first cut-off frequency is above a range of frequencies that convey a majority of first formants.

22. The processor of claim 21 in which said second cut-off frequency is below a range of frequencies that convey a majority of second formants.

23. The processor of claim 22 in which said first cut-off frequency is above 600 hertz.

24. The processor of claim 23 in which said second cut-off frequency is below 1500 hertz.

25. The processor of claim 19 further comprising filter control logic for varying an overall rate of change in amplitude with respect to a change in frequency of a portion of the fourth band of low frequencies as a continuous function of the determined magnitude of the audio signal transmitted by the first filter.

26. The processor of claim 25 in which said filter control logic provides for varying the overall rate of change in amplitude with respect to the change in frequency up to a maximum roll-off from said second cut-off frequency of no greater than 24 decibels per octave.

27. The processor of claim 26 in which attenuation at 1000 hertz is no greater than 5 decibels when the overall rate of change in amplitude with respect to the change in frequency is at the maximum roll-off.

28. The processor of claim 27 in which attenuation at 250 hertz is at least 35 decibels when the overall rate of change in amplitude with respect to the change in frequency is at the maximum roll-off.

29. The processor of claim 28 in which said first filter and said variable second filter are both fourth order filters.

30. A method of processing an audio signal for suppressing noise while preserving distinctive features of speech comprising the steps of:

determining an energy level of a noise component of the audio signal;

filtering the audio signal in accordance with a variable response curve expressible as a transfer function in decibels over a domain of audible frequencies;

varying a slope of a portion of the variable response curve as a continuous function of the determined energy level of the noise component for reducing the noise component without perceptively attenuating a range of frequencies that convey a majority of second formant transitions between consonants and vowels; and said step of varying slope including moving a corner frequency representing a zero of the transfer function as a continuous function of the determined energy level of the noise component.

31. A method of processing an audio signal for suppressing noise while preserving distinctive features of speech comprising the steps of:

determining an energy level of a noise component of the audio signal;

filtering the audio signal in accordance with a variable response curve expressible in decibels over a domain of audible frequencies;

varying a slope of a portion of the variable response curve as a continuous function of the determined energy level of the noise component for reducing the noise component without perceptively attenuating a range of frequencies that convey a majority of second format transitions between consonants and vowels; and limiting attenuation of the audio signal at 1000 hertz to no greater than 5 decibels when the slope of the response curve is at a maximum roll-off.

32. The method of claim 31 in which said step of filtering includes separating the audio signal into a first band of low frequencies that are substantially attenuated and a second band of high frequencies that are substantially transmitted at a first cut-off frequency that is below the range of frequencies conveying the majority of second formant transitions.

33. The method of claim 32 in which said step of varying the slope includes maintaining the cut-off frequency substantially constant while the slope of the response curve is varied.

34. The method of claim 32 in which the maximum roll-off from the first cut-off frequency is no greater than 24 decibels per octave.

35. The method of claim 32 including a further step of attenuating the audio signal at 250 hertz by at least 35 decibels when the slope of the response curve is at the maximum roll-off.

36. The method of claim 32 in which said step of determining includes independently separating said audio signal into a third band of low frequencies that are substantially transmitted and a fourth band of high frequencies that are substantially attenuated at a second cut-off frequency.

37. The method of claim 36 in which said step of determining includes detecting a magnitude of the audio signal that is transmitted by said step of independently separating the audio signal.

38. The method of claim 37 in which said second cut-off frequency is related to said first cut-off frequency so that the third band of low frequencies that are substantially transmitted approximately corresponds to the first band of low frequencies that are substantially attenuated.

39. The method of claim 36 in which said second cut-off frequency is above a range of frequencies that convey a majority of first formants.

40. The method of claim 39 in which said second cut-off frequency is above 600 hertz.

41. The method of claim 40 in which said first cut-off frequency is below 1500 hertz.

42. A method of processing an audio signal for improving speech perception in a noisy environment comprising the steps of:

separating the audio signal into a first band of low frequencies that are substantially transmitted and a second band of high frequencies that are substantially attenuated at a first cut-off frequency;

determining a magnitude of a portion of the audio signal that is transmitted by said step of separating the audio signal as a measure of noise;

independently separating the audio signal into a third band of high frequencies that are substantially transmitted and a fourth band of low frequencies that are substantially attenuated at a second cut-off frequency;

setting the first cut-off frequency not higher than the second cut-off frequency;

attenuating said second band of frequencies above said second cut-off frequency at a roll-off rate of at least 24 decibels per octave; and varying the attenuation of the fourth band of frequencies as a function of the determined magnitude of noise.

43. The method of claim 42 in which the first cut-off frequency is above a range of frequencies that convey a majority of first formants.

44. The method of claim 43 in which the second cut-off frequency is below a range of frequencies that convey a majority of second formants.

45. The method of claim 44 in which the first cut-off frequency is above 600 hertz.

46. The method of claim 45 in which the second cut-off frequency is below 1500 hertz.

47. The method of claim 42 in which said step of varying the audio signal provides for varying an overall rate of change in amplitude with respect to a change a frequency of a portion of the fourth band of frequencies as a continuous function of the determined magnitude of noise.

48. The method of claim 47 in which said step of varying the slope includes maintaining the second cut-off frequency substantially constant while varying the overall rate of change in amplitude with respect to the change in frequency of the portion of the fourth band of frequencies.

* * * * *

UNITED STATES PATENT AND TRADEMARK OFFICE
CERTIFICATE OF CORRECTION

PATENT NO. : 5,285,502

DATED : February 8, 1994

INVENTOR(S) : Walton et al.

It is certified that error appears in the above-identified patent and that said Letters Patent is hereby corrected as shown below:

In the drawings, Sheet 1, Fig. 2, the cut-off frequency 18 should be positioned along the response curve 16 at approximately 750 hertz. As per attached sheet.

Signed and Sealed this

Twenty-first Day of March, 1995

Attest:

BRUCE LEHMAN

Attesting Officer

Commissioner of Patents and Trademarks